(12) United States Patent
Numata et al.

(10) Patent No.: US 10,473,969 B2
(45) Date of Patent: Nov. 12, 2019

(54) DISPLAY DEVICE

(71) Applicant: Japan Display Inc., Minato-ku (JP)

(72) Inventors: Yudai Numata, Tokyo (JP); Takeo Koito, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/917,062

(22) Filed: Mar. 9, 2018

(65) Prior Publication Data

US 2018/0259810 A1 Sep. 13, 2018

(30) Foreign Application Priority Data

Mar. 10, 2017 (JP) ................... 2017-046268

(51) Int. Cl.
*G02B 27/22* (2018.01)
*G02F 1/1335* (2006.01)
*G02B 27/28* (2006.01)
*G09G 3/20* (2006.01)
*G09G 3/36* (2006.01)
*B29D 11/00* (2006.01)
*G02F 1/133* (2006.01)
*G06F 1/16* (2006.01)
*G02F 1/13363* (2006.01)

(52) U.S. Cl.
CPC ... *G02F 1/133514* (2013.01); *G02B 27/2292* (2013.01); *G02B 27/283* (2013.01); *G02B 27/286* (2013.01); *G02F 1/133512* (2013.01); *G02F 1/133528* (2013.01); *G02F 1/133553* (2013.01); *G09G 3/20* (2013.01); *G09G 3/3648* (2013.01); *B29D 11/00326* (2013.01); *G02F 1/13306* (2013.01); *G02F 2001/13355* (2013.01); *G02F 2001/133548* (2013.01); *G02F 2001/133638* (2013.01); *G02F 2201/121* (2013.01); *G02F 2201/123* (2013.01); *G02F 2203/02* (2013.01); *G02F 2203/12* (2013.01); *G02F 2203/50* (2013.01); *G02F 2203/62* (2013.01); *G06F 1/1637* (2013.01); *G09G 2300/0426* (2013.01)

(58) Field of Classification Search
CPC ................................................. G02B 27/2292
See application file for complete search history.

(56) References Cited

U.S. PATENT DOCUMENTS 5,861,993 A * 1/1999 Shanks .................. G02B 5/124
 359/629
2010/0182572 A1* 7/2010 Huang ............... G02B 27/1066
 353/20

(Continued)

FOREIGN PATENT DOCUMENTS

JP 2011-253128 12/2011
JP 2014-106330 6/2014

*Primary Examiner* — Edmond C Lau
(74) *Attorney, Agent, or Firm* — Oblon, McClelland, Maier & Neustadt, L.L.P.

(57) ABSTRACT

According to one embodiment, a display device includes first and second retroreflective elements which retroreflect incident light, an optical element which is located between the first retroreflective element and the second retroreflective element, and includes a first surface facing the first retroreflective element and a second surface facing the second retroreflective element and a display unit which is located on a side facing the first surface and emits display light.

17 Claims, 12 Drawing Sheets

(56) References Cited

U.S. PATENT DOCUMENTS

2017/0031157 A1    2/2017   Koito et al.
2017/0146807 A1*   5/2017   Kim .................. G02B 27/26
2017/0242173 A1    8/2017   Numata et al.
2017/0285359 A1   10/2017   Numata et al.
2017/0285402 A1   10/2017   Koito et al.

* cited by examiner

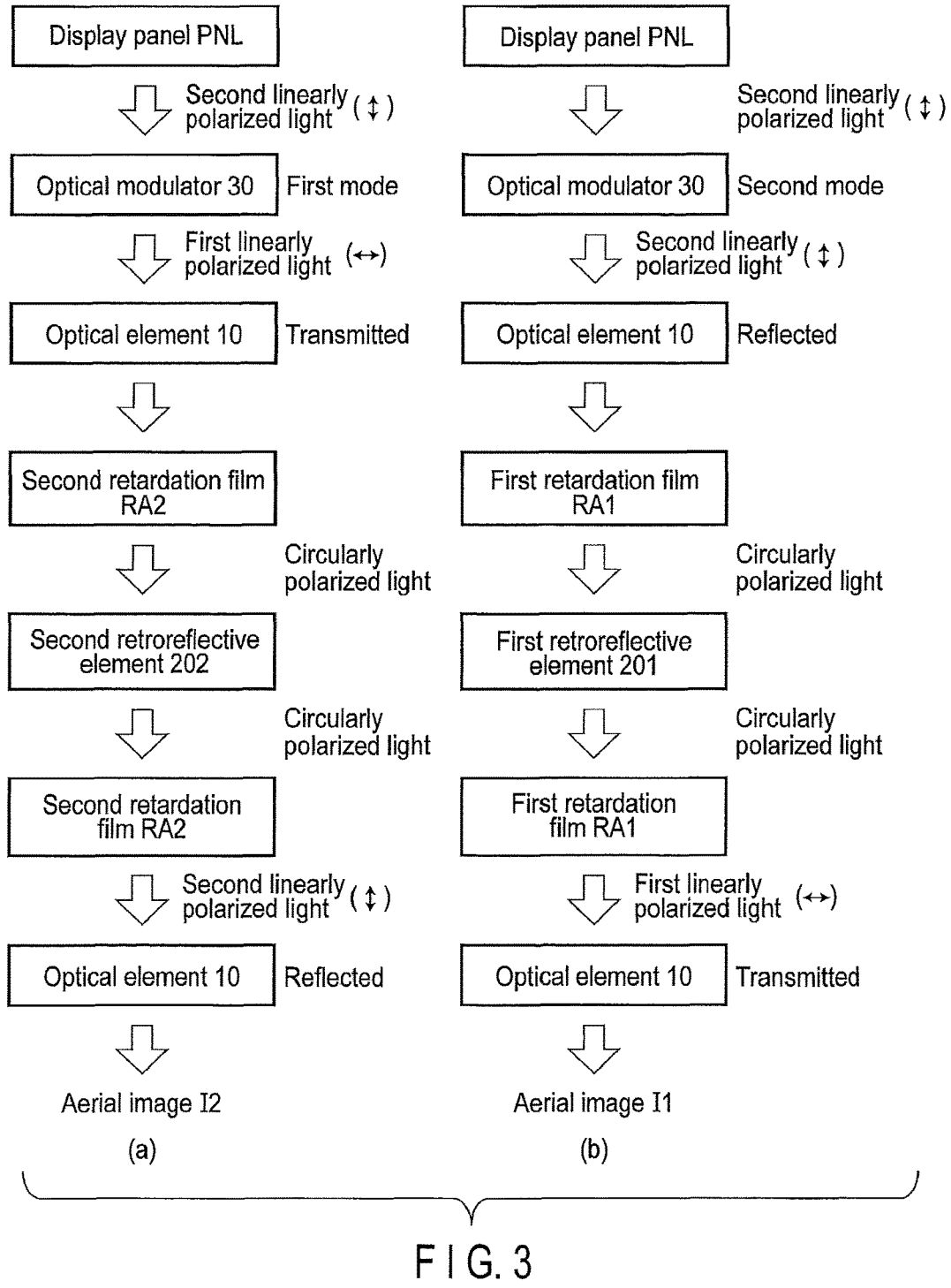
F I G. 3

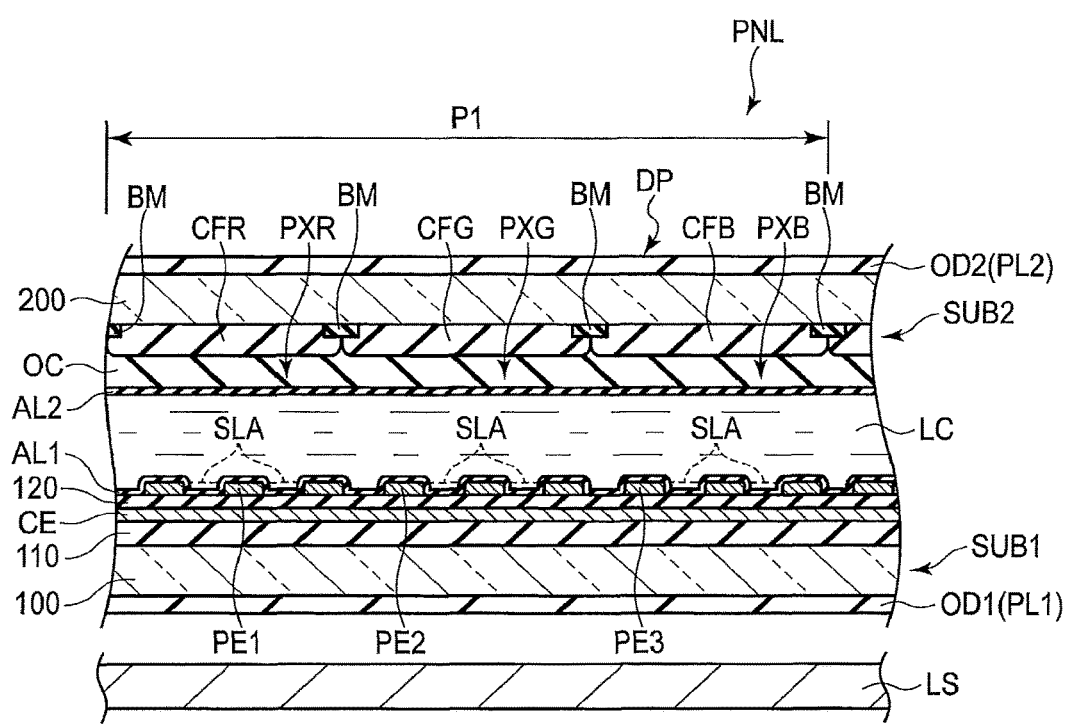
F I G. 6

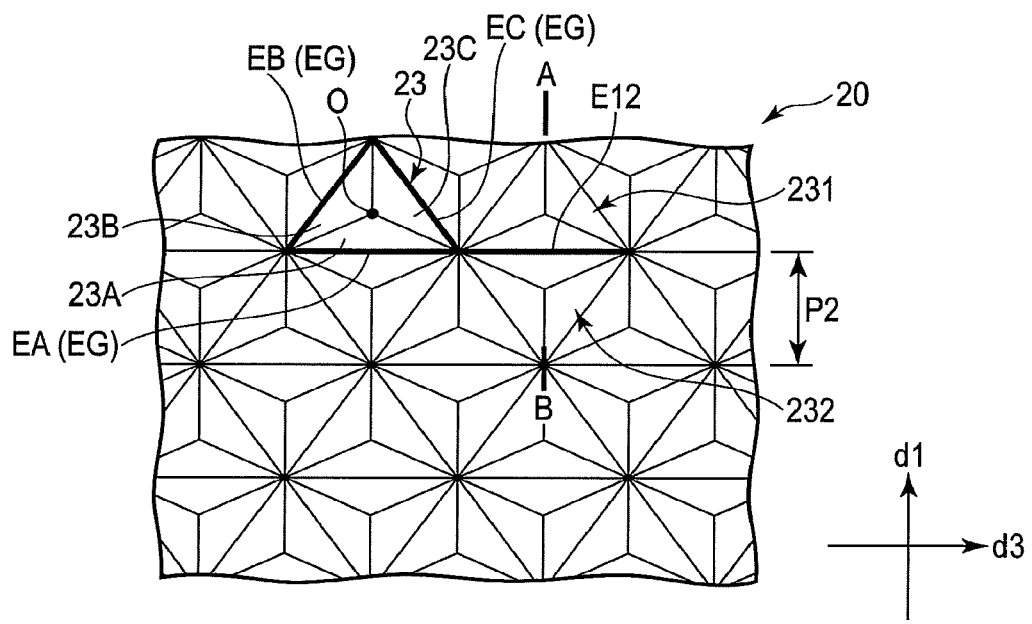
F I G. 7
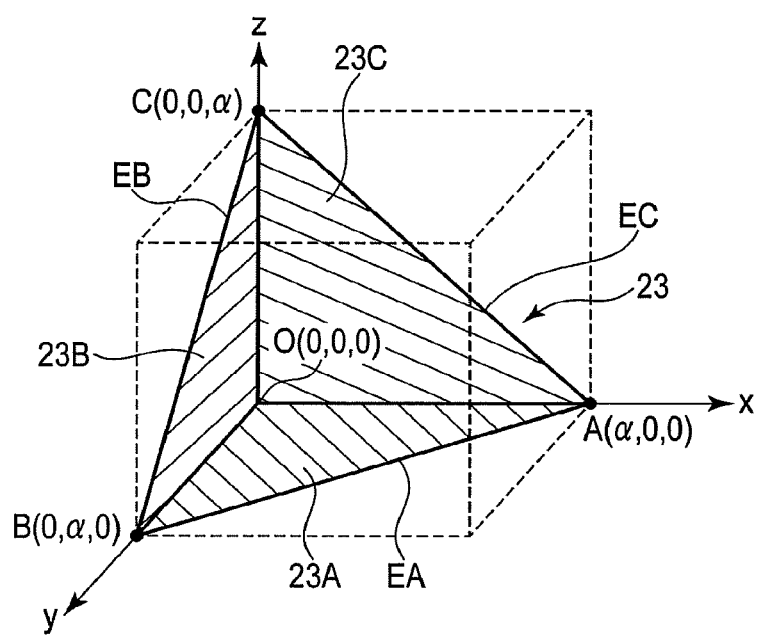
F I G. 8

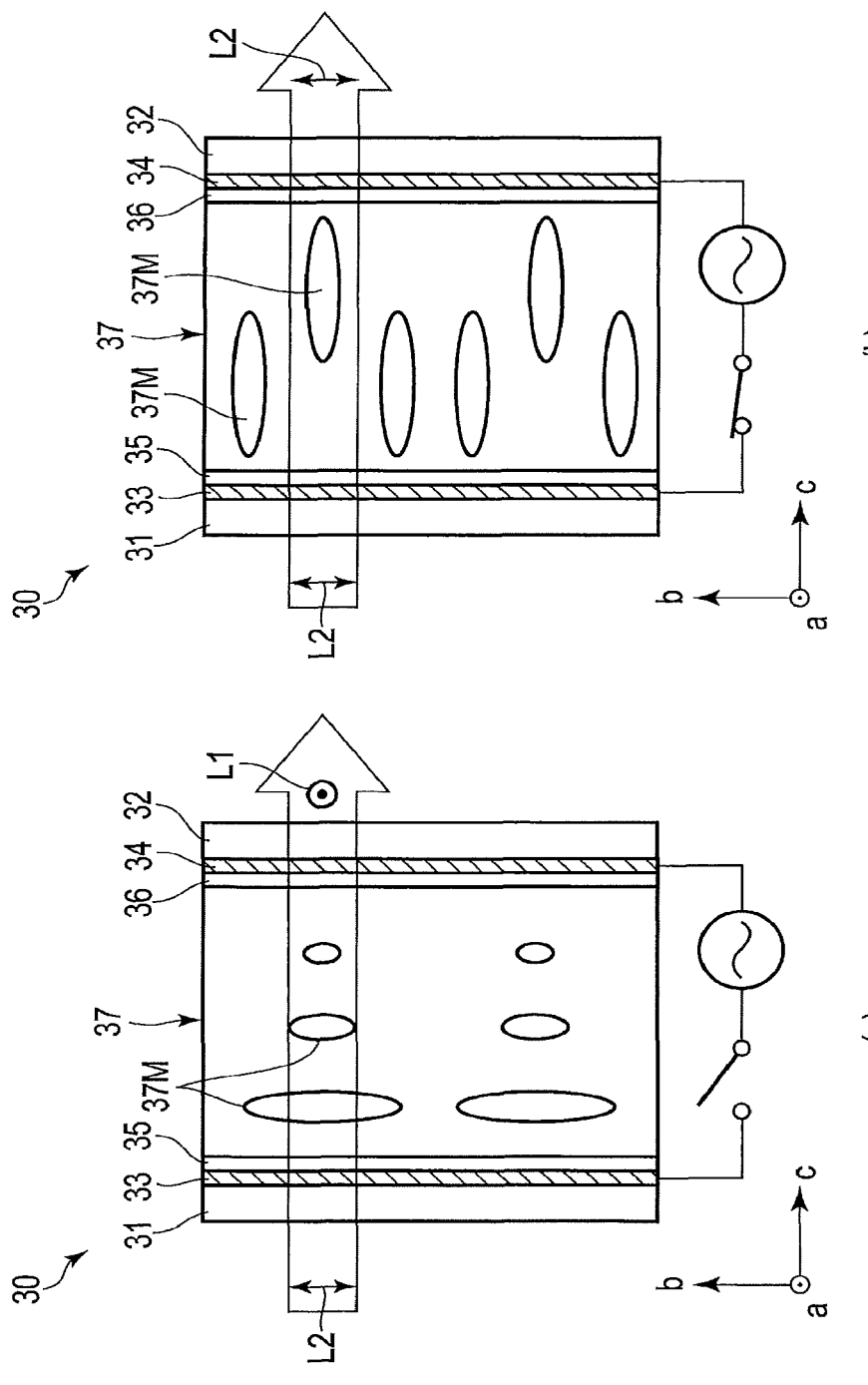
F I G. 9

DISPLAY DEVICE

CROSS-REFERENCE TO RELATED APPLICATIONS

This application is based upon and claims the benefit of priority from Japanese Patent Application No. 2017-046268, filed Mar. 10, 2017, the entire contents of which are incorporated herein by reference.

FIELD

Embodiments described herein relate generally to a display device.

BACKGROUND

For example, an imaging device comprising a polarizing filter and a retroreflective element is suggested. In the imaging device, an aerial image for a display image is formed at a position where the aerial image and the emission point of display light for the display image are plane-symmetrical with respect to the polarizing filter.

BRIEF DESCRIPTION OF THE DRAWINGS

FIG. 3 shows an example of the optical path until the display light emitted from the display unit shown in FIG. 2 forms aerial images.

FIG. 6 is a cross-sectional view showing a structural example of the display panel shown in FIG. 2.

FIG. 7 is a plan view showing a structural example of a retroreflective element applied to the optical elements shown in FIG. 1.

FIG. 8 is a perspective view showing a structural example of each retroreflector shown in FIG. 7.

FIG. 9 is a cross-sectional view showing a structural example of the modulating element shown in FIG. 2.

DETAILED DESCRIPTION

Figure 1:
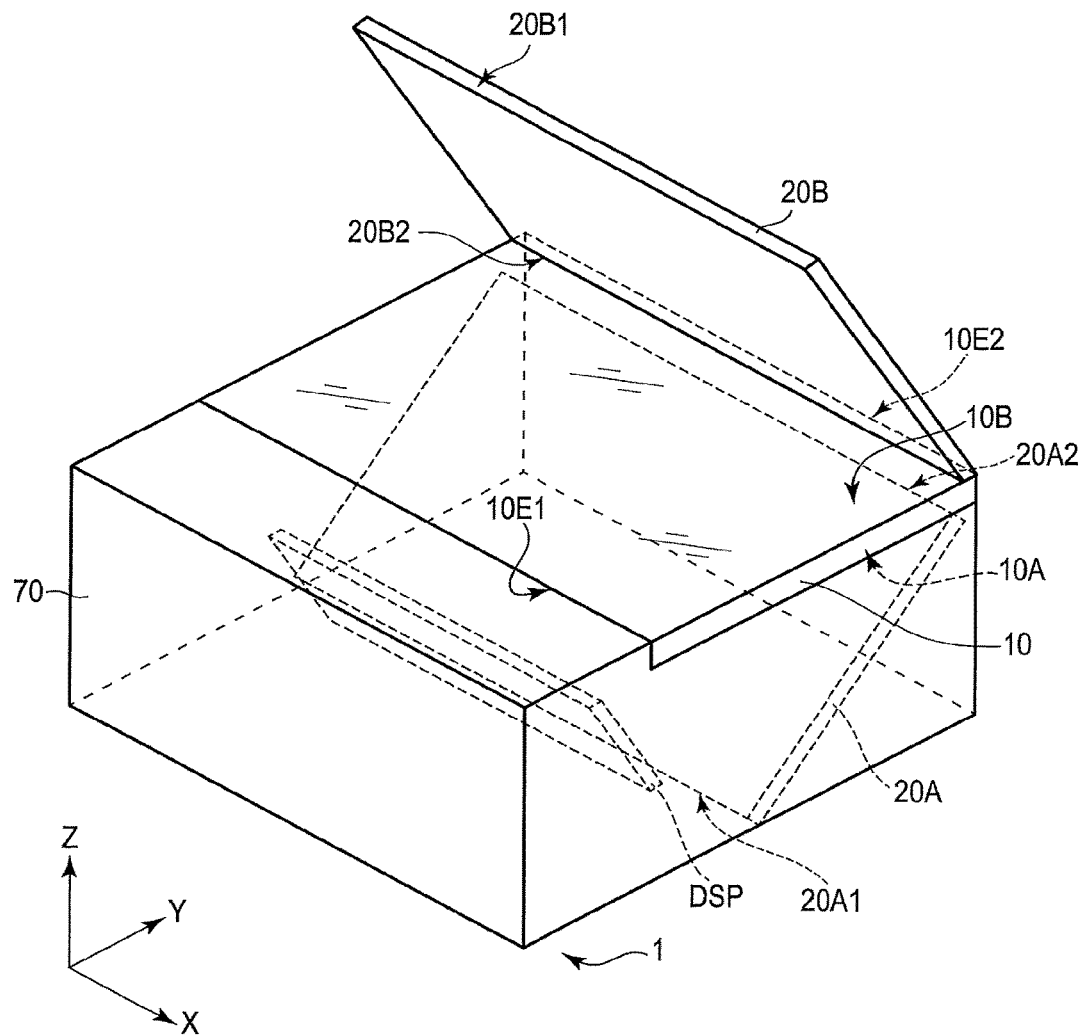
FIG. 1 is a perspective view showing an example of the external appearance of a display device according to a first embodiment.

In general, according to one embodiment, a display device includes first and second retroreflective elements which retroreflect incident light, an optical element which is located between the first retroreflective element and the second retroreflective element, and includes a first surface facing the first retroreflective element and a second surface facing the second retroreflective element, and a display unit which is located on a side facing the first surface and emits display light.

According to another embodiment, a display device includes a first optical element which includes a transmission axis transmitting first linearly polarized light, and reflects second linearly polarized light intersecting the transmission axis, a display unit which emits the first linearly polarized light and the second linearly polarized light toward the first optical element, a second optical element which retroreflects the second linearly polarized light reflected on the first optical element, and modulates the second linearly polarized light reflected on the first optical element into the first linearly polarized light, and a third optical element which retroreflects the first linearly polarized light having passed through the first optical element, and modulates the first linearly polarized light having passed through the first optical element into the second linearly polarized light.

Embodiments will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the structural elements having functions, which are identical or similar to the functions of the structural elements described in connection with preceding drawings, are denoted by like reference numerals, and an overlapping detailed description is omitted unless otherwise necessary.

[First Embodiment]

FIG. 1 is a perspective view showing an example of the external appearance of a display device 1 according to a first embodiment. A first direction X, a second direction Y and a third direction Z are orthogonal to one another. However, they may intersect one another at an angle other than 90 degrees. In the present embodiment, the third direction Z may be referred to as "upward" or "above". The opposite direction of the third direction Z may be referred to as "downward" or "below".

The display device 1 comprises a display unit DSP and optical elements 10, 20A and 20B. In the present embodiment, the optical elements 10, 20A and 20B are equivalent to first, second and third optical elements, respectively. The display unit DSP, the optical element 10 and the optical element 20A are housed in a housing 70. In the example, the optical element 20B is held by the housing 70. However, the optical element 20B may be held by a member different from the housing 70.

The structure of the display unit DSP is not particularly limited as long as it emits display light. For example, the display unit DSP is a liquid crystal display device comprising a liquid crystal layer. For example, the display unit DSP may be a self-luminous display device comprising an organic electroluminescent element, etc., an electronic paper display device comprising an electrophoretic element, etc., a display device to which micro-electromechanical systems (MEMS) are applied, or a display device to which electrochromism is applied.

The optical element 10 reflects at least part of incident light and transmits part of incident light. For example, the optical element 10 has a plate-like shape, and comprises a first surface 10A and a second surface 10B on a side opposite to the first surface 10A. The optical element 10 is provided such that the first and second surfaces 10A and 10B are parallel to the X-Y plane defined by the first and second directions X and Y. The first surface 10A faces the display unit DSP and the optical element 20A. The second surface 10B faces the optical element 20B. The optical element 10 comprises edge portions 10E1 and 10E2 extending in the first direction X. The edge portion (first edge portion) 10E1 is located on a side close to the display unit DSP. The edge portion (second edge portion) 10E2 is located between the optical element 20A and the optical element 20B.

The optical elements 20A and 20B impart a phase difference to incident light and retroreflect incident light. The optical elements 20A and 20B are arranged in the third direction Z. The optical element 10 is interposed between the optical element 20A and the optical element 20B.

The optical element 20A and the display unit DSP are arranged in the second direction Y in the housing 70. In the example shown in FIG. 1, the optical element 20A comprises edge portions 20A1 and 20A2 extending in the first direction X. The edge portion 20A1 is closer to the display unit DSP than the edge portion 20A2 in the second direction Y. The edge portion 20A2 is closer to the optical element 10 than the edge portion 20A1 in the third direction Z.

The optical element 20B faces the optical element 20A and the display unit DSP across the intervening optical element 10. In the example shown in FIG. 1, the optical element 20B comprises edge portions 20B1 and 20B2 extending in the first direction X. The edge portion 20B1 is closer to the display unit DSP than the edge portion 20B2 in the second direction Y. The edge portion 20B2 is closer to the optical element 10 than the edge portion 20B1 in the third direction Z. In the example shown in FIG. 1, the optical element 20B is provided substantially parallel to the display unit DSP.

Figure 2:
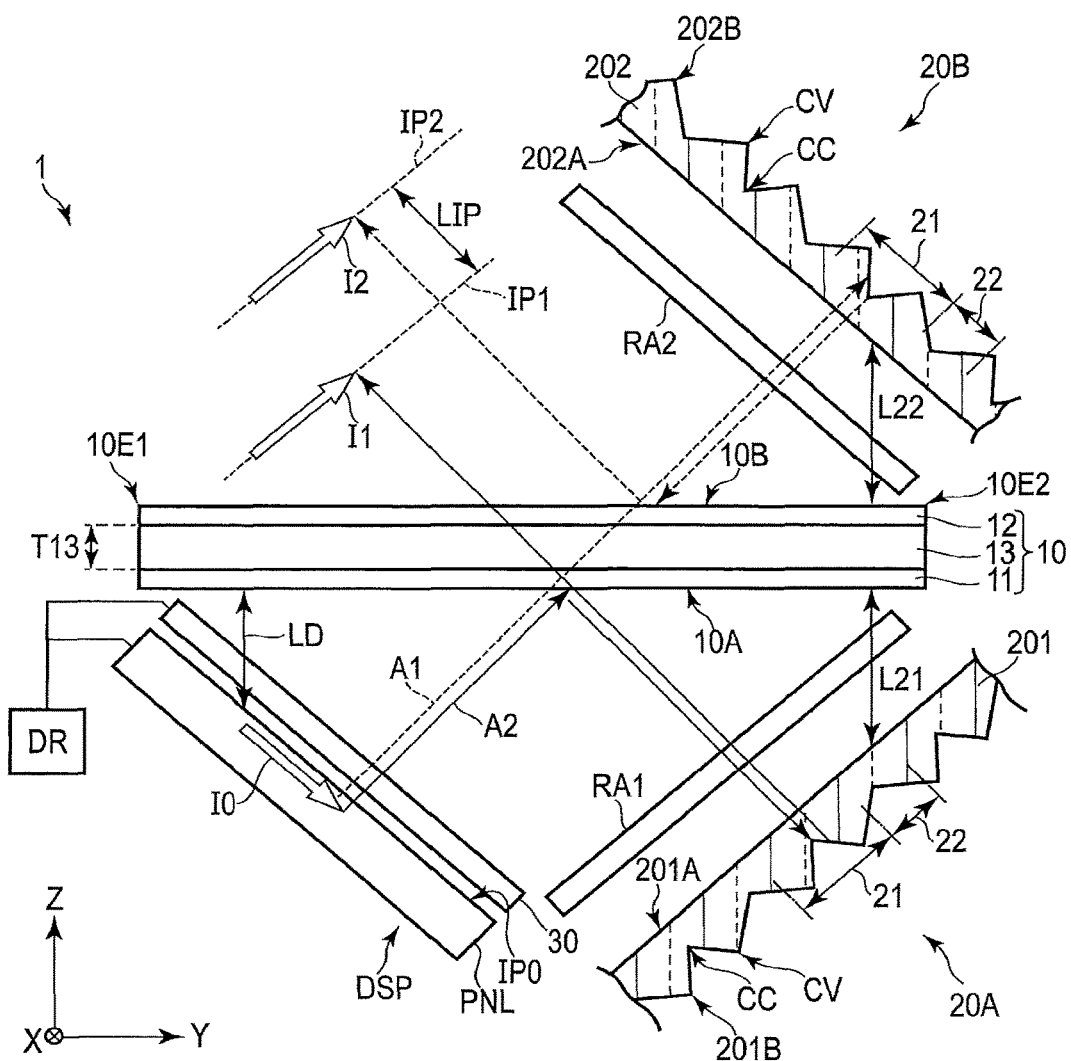
FIG. 2 shows a structural example of the display device shown in FIG. 1.

FIG. 2 shows a structural example of the display device 1 shown in FIG. 1. FIG. 2 shows a surface parallel to the Y-Z plane defined by the second and third directions Y and Z. The display device 1 comprises the optical element 10, the display unit DSP, the optical element 20A and the optical element 20B.

The optical element 10 comprises a first polarizing element 11, a second polarizing element 12 and a support substrate 13.

The first and second polarizing elements 11 and 12 comprise a transmission axis which transmits first linearly polarized light and reflect second linearly polarized light orthogonal to the transmission axis. For example, the first linearly polarized light is a P wave parallel to an incident surface. The second linearly polarized light is an S wave perpendicular to an incident surface. The first and second polarizing elements 11 and 12 are structured by, for example, a wire-grid polarizing filter, a reflective polarizing film to which a brightness enhancement film is applied, or a multilayer body in which the reflective polarizing film and a linear polarizer are stacked. In the example shown in FIG. 2, the first polarizing element 11 comprises the first surface 10A. The first surface 10A faces the display unit DSP and the optical element 20A. The second polarizing element 12 comprises the second surface 10B. The second surface 10B faces the optical element 20B. The first and second surfaces 10A and 10B are surfaces parallel to the X-Y plane, and are equivalent to reflective surfaces for the second linearly polarized light.

The support substrate 13 is located between the first polarizing element 11 and the second polarizing element 12, and is attached to the first and second polarizing elements 11 and 12. For example, the support substrate 13 is formed of glass or resin. The refractive index of the support substrate 13 is preferably equal to that of the material of the first and second polarizing elements 11 and 12.

The display unit DSP comprises a display panel PNL, a modulating element 30 and a driver DR.

The display panel PNL emits display light for display image I0. In the present embodiment, for example, the display panel PNL is a liquid crystal display panel which holds a liquid crystal layer between a pair of substrates. The display light emitted from the display panel PNL is, for example, the second linearly polarized light. The display panel PNL comprises a display surface IP0 which displays display image I0. The display surface IP0 faces the first surface 10A. In the example shown in FIG. 2, the display panel PNL is provided such that distance LD between the display surface IP0 and the first surface 10A is increased in the second direction Y. In other words, distance LD on the edge portion 10E1 side is less than distance LD on the edge portion 10E2 side. Distance LD is a distance parallel to the third direction Z.

The liquid crystal display panel may be a transmissive panel which displays an image by selectively transmitting the light emitted from a light source device, a reflective panel which displays an image by selectively reflecting external light or the light emitted from a light source device, or a transflective panel which comprises both the transmissive display function and the reflective display function. In place of the display panel PNL, the display unit DSP may comprise a screen on which the light emitted from a projector is projected or may comprise a display medium (for example, a poster) lighted by an illumination device.

The modulating element 30 overlaps the display panel PNL. In the example shown in FIG. 2, the modulating element 30 faces the display surface IP0 such that they are substantially parallel to each other. The modulating element 30 may be attached to the display surface IP0 of the display panel PNL or may be spaced apart from the display surface IP0. The modulating element 30 selectively modulates the second linearly polarized light emitted from the display panel PNL into the first linearly polarized light. The term "selectively" includes the meanings of temporal modulation and spatial modulation. In the following example, this specification explains the modulating element 30 which temporally modulates light. The modulating element 30 which spatially modulates light is explained later.

The modulating element 30 is controlled in two modes and imparts a phase difference to transmitted light in accordance with the mode. For example, in a first mode, the modulating element 30 imparts a phase difference of approximately $\lambda/2$ to transmitted light. Here, $\lambda$ is the wavelength of transmitted light. When the second linearly polarized light passes through the modulating element 30 in the first mode, the polarization plane is rotated approximately 90 degrees. Thus, the second linearly polarized light is converted into the first linearly polarized light. In a second mode, the modulating element 30 does not impart a phase difference to transmitted light. In the second mode, when the second linearly polarized light passes through the modulating element 30, the polarization plane is not changed. Thus, when the mode is switched between the first mode and the second mode, it is possible to temporally switch the polarization plane of the display light emitted from the display unit DSP such that the polarization plane is parallel or perpendicular to the transmission axis of the optical element 10.

The driver DR drives the display panel PNL and the modulating element 30. The driver DR controls the display operation of the display panel PNL. The driver DR switches the mode between the first mode and the second mode in the modulating element 30. For example, the driver DR switches the mode of the modulating element 30 between the first mode and the second mode in synchronization with display image I0 displayed on the display panel PNL.

The optical element 20A comprises a first retroreflective element 201 and a first retardation film RA1.

The first retroreflective element 201 retroreflects incident light. In other words, the first retroreflective element 201 reflects incident light in a direction parallel to incident light and opposite to that of incident light. The first retroreflective element 201 is located below the first surface 10A, and comprises a surface 201A facing the first surface 10A and the display unit DSP, and a back surface 201B on a side opposite to the surface 201A. The first retroreflective element 201 is inclined with respect to the X-Y plane such that distance (first distance) L21 between the first surface 10A and the surface 201A is decreased in the second direction Y. In other words, distance L21 on the edge portion 10E1 side is greater than distance L21 on the edge portion 10E2 side. Distance L21 is a length parallel to the third direction Z.

In the example shown in FIG. 2, the surface 201A is flat. The back surface 201B comprises retroreflectors. The back surface 201B is an uneven surface comprising concave portions CC and convex portions CV. The convex portions CV protrude to a side opposite to the optical element 10. On the back surface 201B, the first retroreflective element 201 comprises retroreflective portions 21 which retroreflect the light reflected on the optical element 10, and non-retroreflective portions 22 which do not retroreflect the light reflected on the optical element 10 and scatter the light reflected on the optical element 10.

The first retroreflective element 201 is formed of, for example, a resinous material. The retroreflective portions 21 and the non-retroreflective portions 22 are formed at the interface between the resinous material and air. The light incident on the first retroreflective element 201 is mostly retroreflected on or scattered by the back surface 201B without passing through the back surface 201B.

The first retardation film RA1 imparts a phase difference of approximately λ/4 to transmitted light. The first retardation film RA1 is located between the first surface 10A and the first retroreflective element 201, and overlaps the first retroreflective element 201. In the example shown in FIG. 2, the first retardation film RA1 faces the surface 201A such that they are substantially parallel to each other. The first retardation film RA1 may be attached to the surface 201A or may be spaced apart from the surface 201A.

The optical element 20B comprises a second retroreflective element 202 and a second retardation film RA2.

The second retroreflective element 202 retroreflects incident light. The second retroreflective element 202 is located immediately above the first retroreflective element 201, and comprises a surface 202A facing the second surface 10B, and a back surface 202B on a side opposite to the surface 202A. The second retroreflective element 202 faces the display unit DSP across the intervening optical element 10. In the example shown in FIG. 2, the surface 202A faces the display surface IP0 such that they are substantially parallel to each other. The second retroreflective element 202 is inclined with respect to the X-Y plane such that distance (second distance) L22 between the surface 202A and the second surface 10B is decreased in the second direction Y. In other words, distance L22 on the edge portion 10E1 side is greater than distance L22 on the edge portion 10E2 side. Distance L22 is a length parallel to the third direction Z.

In a manner similar to that of the first retroreflective element 201, the second retroreflective element 202 is formed of a resinous material. In the example shown in FIG. 2, the surface 202A is flat. In a manner similar to that of the back surface 201B, the back surface 202B is an uneven surface comprising the concave portions CC and the convex portions CV, and comprises the retroreflective portions 21 and the non-retroreflective portions 22. The light incident on the second retroreflective element 202 is mostly retroreflected on or scattered by the back surface 202B without passing through the back surface 202B.

The second retardation film RA2 imparts a phase difference of approximately λ/4 to transmitted light. The second retardation film RA2 is located between the second surface 10B and the second retroreflective element 202, and overlaps the second retroreflective element 202. In the example shown in FIG. 2, the second retardation film RA2 faces the surface 202A such that they are substantially parallel to each other. The second retardation film RA2 may be attached to the surface 202A or may be spaced apart from the surface 202A.

In the above structure, the light incident on the first retroreflective element 201 and retroreflected on the first retroreflective element 201 passes through the first retardation film RA1 twice. The light incident on the second retroreflective element 202 and retroreflected on the second retroreflective element 202 passes through the second retardation film RA2 twice. In this way, a phase difference of approximately λ/2 is imparted to the light retroreflected on the optical elements 20A and 20B.

In this example, the first and second retroreflective elements 201 and 202 are provided such that their flat surfaces face the optical element 10. However, the first and second retroreflective elements 201 and 202 may be provided such that their uneven surfaces (in other words, the surfaces comprising the retroreflectors) face the optical element 10.

The uneven surfaces (the back surfaces 201B and 202B in the example shown in FIG. 2) may be covered with a reflective film having light reflectivity. The reflective film is formed of a material having light reflectivity, such as silver (Ag), aluminum (Al) or aluminum alloy. The thickness of the reflective film is substantially uniform. Surface treatment may be applied to the reflective film to prevent corrosion. Alternatively, the reflective film may be coated with an inorganic material such as silicon nitride (SiN).

FIG. 3 shows an example of the optical path until the display light emitted from the display unit DSP forms aerial images I1 and I2. Aerial images I1 and I2 are equivalent to the real images of display image I0. FIG. 3(a) shows a case where the modulating element 30 is controlled so as to be in the first mode. FIG. 3(b) shows a case where the modulating element 30 is controlled so as to be in the second mode. With reference to FIG. 3 and FIG. 2, this specification explains the function of each structure to form aerial images I1 and I2 from display image I0 in the display unit DSP. FIG. 2 shows an optical path in the first mode with dashed arrows A1, and an optical path in the second mode with solid arrows A2. In the present embodiment, the display panel PNL emits the second linearly polarized light equivalent to the display light of display image I0. Here, the second linearly polarized light comprises a polarization plane orthogonal to the transmission axis of the optical element 10.

As shown in FIG. 3(a), when the modulating element 30 is controlled so as to be in the first mode, the modulating element 30 modulates the second linearly polarized light emitted from the display panel PNL into the first linearly polarized light. Here, the first linearly polarized light comprises a polarization plane parallel to the transmission axis of the optical element 10. As shown with dashed arrows A1 in FIG. 2, the first linearly polarized light passes through the optical element 10. Subsequently, the first linearly polarized light passes through the second retardation film RA2 and is converted into circularly polarized light. Here, for example, the circularly polarized light is light whose polarization plane rotates counterclockwise as its path when it is viewed in a direction facing the direction of travel of light. Subsequently, the circularly polarized light is retroreflected on the second retroreflective element 202. The retroreflected light is circularly polarized light. The retroreflected circularly polarized light passes through the second retardation film RA2 again, and is converted into the second linearly polarized light. The second linearly polarized light is reflected on the second surface 10B and forms aerial image I2 for display image I0. The imaging plane IP2 of aerial image I2 and the display surface IP0 are plane-symmetrical with respect to the second surface 10B.

As shown in FIG. 3(b), when the modulating element 30 is in the second mode, the modulating element 30 does not modulate the second linearly polarized light. Even after the second linearly polarized light passes through the modulating element 30, the second linearly polarized light is maintained. As shown with sold arrows A2 in FIG. 2, the second linearly polarized light is reflected on the first surface 10A toward the first retroreflective element 201. The second linearly polarized light passes through the first retardation film RA1 and is converted into circularly polarized light. Subsequently, the circularly polarized light is retroreflected on the first retroreflective element 201. The retroreflected circularly polarized light passes through the first retardation film RA1 again, and is converted into the first linearly polarized light. The first linearly polarized light passes through the optical element 10 and forms aerial image I1 for display image I0. The imaging plane IP1 of aerial image I1 and the display surface IP0 are plane-symmetrical with respect to the first surface 10A.

As described above, aerial images I1 and I2 having different imaging planes are formed by switching the mode of the modulating element 30 between the first mode and the second mode. In the example shown in FIG. 2, aerial image I2 is located above aerial image I1, in other words, in a direction moving away from the optical element 10 in the third direction Z in comparison with aerial image I1. Distance LIP between the imaging plane IP1 and the imaging plane IP2 is changed based on the distance parallel to the third direction Z between the first surface 10A and second surface 10B. Alternatively, distance LIP depends on thickness T13 of the support substrate 13. Distance LIP is a distance in a direction orthogonal to the imaging planes IP1 and IP2.

Figure 4:
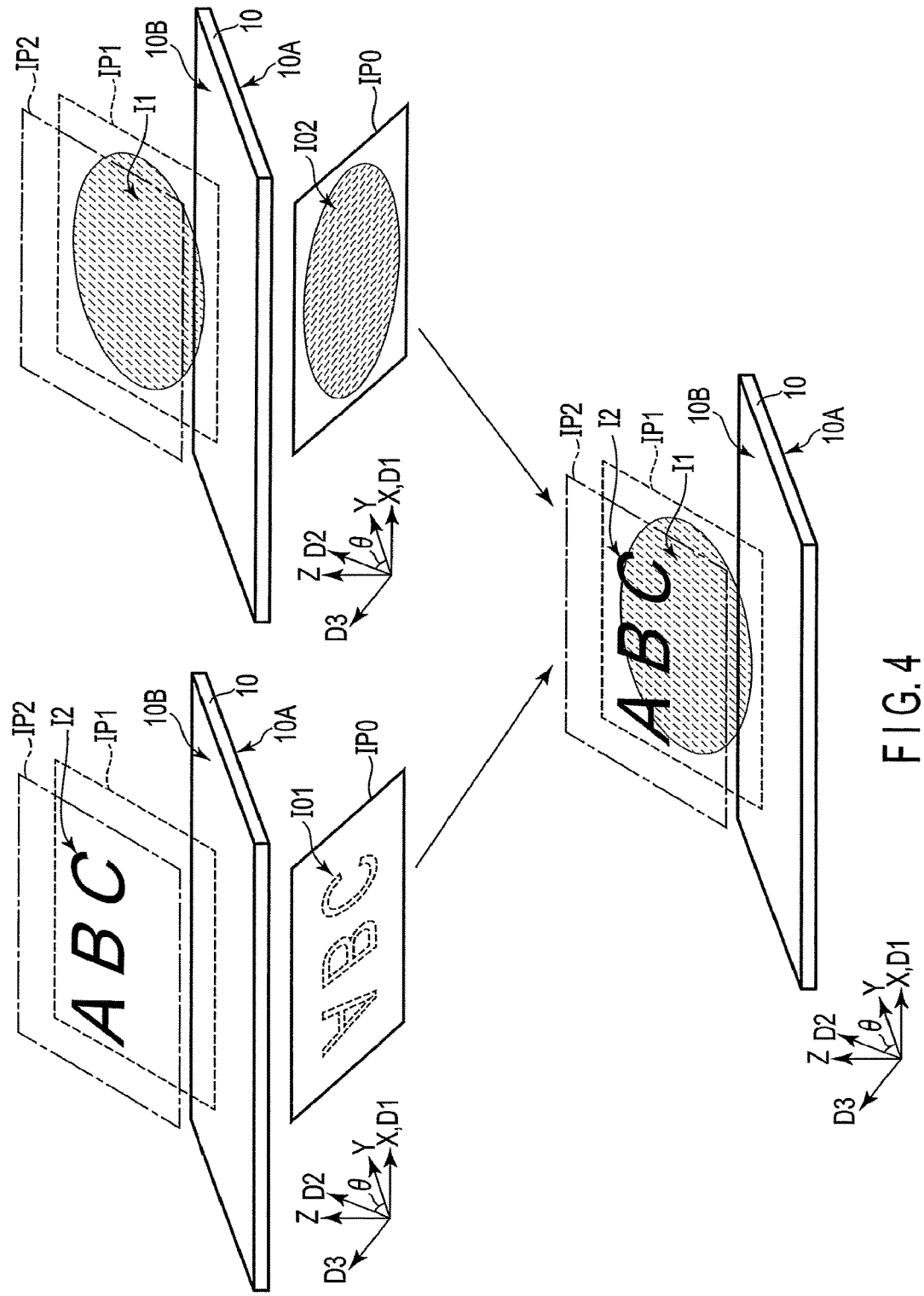
FIG. 4 shows the positional relationship of the display surface, optical element and imaging planes shown in FIG. 2.

FIG. 4 shows the positional relationship of the display surface IP0, the optical element 10 and the imaging planes IP1 and IP2. FIG. 4 shows the imaging plane IP1 with dashed lines and shows the imaging plane IP2 with alternate long and short dash lines. In the example shown in FIG. 4, the display surface IP0 is rectangular. However, the shape of the display surface IP0 is not limited to this example. For example, the display surface IP0 may have a polygonal shape other than a rectangular shape, or may have a circular shape or an elliptic shape.

In the upper left example of FIG. 4, the character string "ABC" is displayed as display image I01 on the display surface IP0. At this time, the modulating element 30 is controlled so as to be in the first mode in synchronization with display image I01. The second linearly polarized light for display image I01 is modulated into the first linearly polarized light by the modulating element 30 in the first mode, and forms aerial image I2 in the imaging plane IP2. As shown with the alternate long and short dash lines in FIG. 4, the imaging plane IP2 and the display surface IP0 are plane-symmetrical with respect to the second surface 10B.

In the upper right example of FIG. 4, a background image is displayed as display image I02 on the display surface IP0. At this time, the modulating element 30 is controlled so as to be in the second mode in synchronization with display image I02. The second linearly polarized light for display image I02 is not modulated by the modulating element 30 in the second mode, and forms aerial image I1 in the imaging plane IP1. As shown with the dashed lines of FIG. 4, the imaging plane IP1 and the display surface IP0 are plane-symmetrical with respect to the first surface 10A.

When the mode is switched between the first mode and the second mode in synchronization with display images I01 and I02 in fast cycles to the extent that the observer cannot notice the switching, as shown in the lower side of FIG. 4, the observer can view the character string "ABC" floated above the background image.

In the present embodiment, the imaging planes IP1 and IP2 are parallel to the surface defined by directions D1 and D2. Direction D1 is equivalent to the first direction X. Direction D2 is a direction intersecting the second direction Y at an acute angle θ. The imaging planes IP1 and IP2 are planes intersecting the X-Y plane, or are surfaces intersecting the first and second surfaces 10A and 10B at an acute angle θ. Direction D3 is orthogonal to directions D1 and D2. The imaging planes IP1 and IP2 are spaced apart from each other in direction D3. In the example shown in FIG. 4, the imaging surface IP1 is closer to the optical element 10 than the imaging plane IP2.

The relationship of display image I0 and aerial images I1 and I2 is as follows. Aerial images I1 and I2 are upside down in terms of the vertical relationship with display image I0 in the third direction Z, and aerial images I1 and I2 are identical to display image I0 in terms of the lateral relationship in the first direction X.

Now, this specification explains the specific examples of structures.

Figure 5:
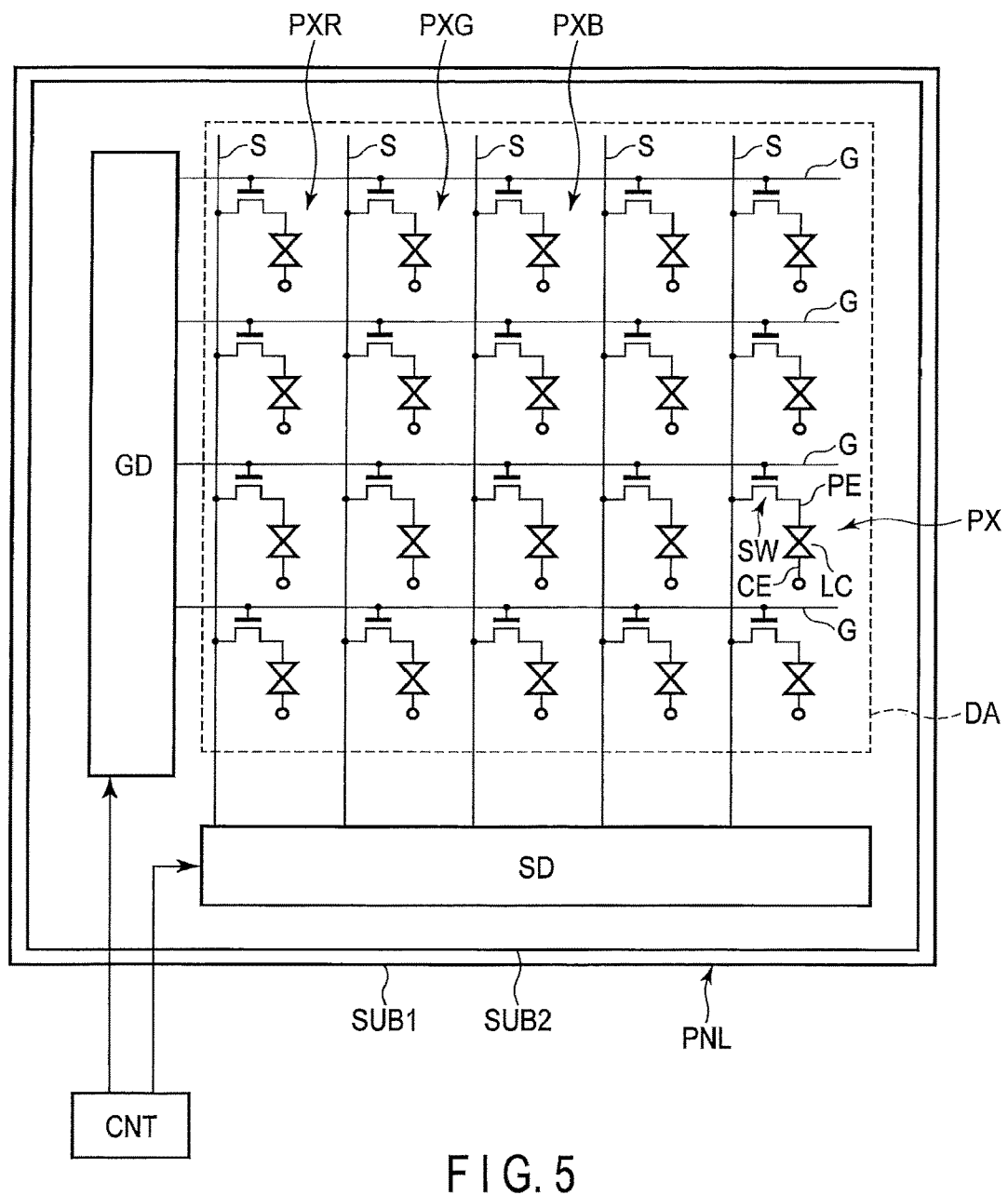
FIG. 5 shows a structural example of the display panel shown in FIG. 2.

FIG. 5 shows a structural example of the display panel PNL shown in FIG. 2. Here, as an example of the display panel PNL, this specification explains a transmissive liquid crystal display panel in an active matrix driving method. The display panel PNL comprises a first substrate SUB1, a second substrate SUB2 facing the first substrate SUB1, and a liquid crystal layer LC held between the first substrate SUB1 and the second substrate SUB2. The first substrate SUB1 is attached to the second substrate SUB2 such that a predetermined cell gap is defined between them. The display panel PNL comprises a display area DA which displays an image. The display area DA comprises a plurality of subpixels PX arranged in matrix.

As the subpixels PX, the display area DA comprises, for example, red pixels PXR corresponding to red, green pixels PXG corresponding green, and blue pixels PXB corresponding to blue. The display area DA may further comprise subpixels corresponding to a color different from red, green and blue (for example, white pixels corresponding to white). Each main pixel for realizing color display includes these subpixels PX corresponding to different colors. In other words, each main pixel is the minimum unit to constitute a color image. In the example shown in FIG. 5, each main pixel includes a red pixel PXR, a green pixel PXG and a blue pixel PXB.

Each red pixel PXR comprises a red color filter and is configured to mainly transmit red light of the white light emitted from a light source device. Each green pixel PXG comprises a green color filter and is configured to mainly transmit green light of the white light emitted from a light source device. Each blue pixel PXB comprises a blue color filter and is configured to mainly transmit blue light of the white light emitted from a light source device. Although not explained in detail, each color filter may be formed in either the first substrate SUB1 or the second substrate SUB2.

The first substrate SUB1 comprises a plurality of scanning lines G, and a plurality of signal lines S intersecting the scanning lines G. The scanning lines G are extended to the outside of the display area DA and are connected to a scanning line driver GD. The signal lines S are extended to the outside of the display area DA and are connected to a signal line driver SD. The scanning line driver GD and the signal line driver SD are connected to a controller CNT. The controller CNT generates a control signal based on a video signal, and controls the scanning line driver GD and the signal line driver SD.

Each subpixel PX comprises a switching element SW, a pixel electrode PE, a common electrode CE, etc. Each switching element SW is electrically connected to a corresponding scanning line G and a corresponding signal line S. The switching element SW is formed by, for example, a thin-film transistor. The pixel electrode PE is electrically connected to the switching element SW. The common electrode CE faces a plurality of pixel electrodes PE.

Here, the explanation of the detailed structure of the display panel PNL is omitted. In a display mode using a longitudinal electric field along the normal of the main surfaces of the substrates or a display mode using an electric field inclined at a tilt with respect to the normal of the main surfaces of the substrates, the first substrate SUB1 comprises the pixel electrodes PE, and the second substrate SUB2 comprises the common electrode CE. In a display mode using a lateral electric field along the main surfaces of the substrates, the first substrate SUB1 comprises both the pixel electrodes PE and the common electrode CE. Further, the display panel PNL may comprise a structure corresponding to a display mode appropriately using a combination of the above longitudinal electric field, lateral electric field and inclined electric field.

FIG. 6 is a cross-sectional view showing a structural example of the display panel PNL shown in FIG. 2. Here, this specification briefly explains a cross-sectional structure of the display panel PNL to which a fringe field switching (FFS) mode, which is one of the display modes using a lateral electric field, is applied.

The first substrate SUB1 comprises a first insulating substrate 100, a first insulating film 110, a common electrode CE, a second insulating film 120, pixel electrodes PE1 to PE3, a first alignment film AL1, etc. The common electrode CE extends over a red pixel PXR, a green pixel PXG and a blue pixel PXB. The pixel electrode PE1 of the red pixel PXR, the pixel electrode PE2 of the green pixel PXG and the pixel electrode PE3 of the blue pixel PXB face the common electrode CE, and comprise slits SLA. In the example shown in FIG. 6, the common electrode CE is located between the first insulating film 110 and the second insulating film 120, and the pixel electrodes PE1 to PE3 are located between the second insulating film 120 and the first alignment film AL1. The pixel electrodes PE1 to PE3 may be located between the first insulating film 110 and the second insulating film 120, and the common electrode CE may be located between the second insulating film 120 and the first alignment film AL1. In this case, the slits SLA are formed in the common electrode CE.

The second substrate SUB2 comprises a second insulating substrate 200, a light-shielding layer BM, color filters CFR, CFG and CFB, an overcoat layer OC, a second alignment film AL2, etc. The color filters CFR, CFG and CFB face the pixel electrodes PE1, PE2 and PE3, respectively, across the intervening liquid crystal layer LC. The color filter CFR is a red color filter. The color filter CFG is a green color filter. The color filter CFB is a blue color filter. In the example shown in FIG. 6, the color filters CFR, CFG and CFB are formed in the second substrate SUB2. However, they may be formed in the first substrate SUB1.

The liquid crystal layer LC is encapsulated between the first alignment film AL1 and the second alignment film AL2.

A light source device LS faces the first substrate SUB1. Various forms are applicable as the light source device LS. Here, the explanation of the detailed structure thereof is omitted.

A first optical element OD1 including a first polarizer PL1 is provided on the external surface of the first insulating substrate 100. A second optical element OD2 including a second polarizer PL2 is provided on the external surface of the second insulating substrate 200. For example, the first absorption axis of the first polarizer PL1 is orthogonal to the second absorption axis of the second polarizer PL2. In the example shown in FIG. 6, the surface of the second optical element OD2 is equivalent to the display surface IP0 of the display panel PNL. As described above, the second polarizer PL2 is provided so as to emit the second linearly polarized light.

The main pixels each including a red pixel PXR, a green pixel PXG and a blue pixel PXB are arranged with pitch P1.

FIG. 7 is a plan view showing a structural example of a retroreflective element 20. The plan view shows the plane defined by first and third directions d1 and d3 orthogonal to each other. The retroreflective element 20 explained here is applicable as the first and second retroreflective elements 201 and 202.

The retroreflective element 20 is formed by a plurality of retroreflectors 23. In the plan view shown in FIG. 7, each retroreflector 23 comprises an equilateral-triangular edge EG. The edge EG comprises a side EA parallel to the third direction d3, and sides EB and EC extending in directions intersecting the first and third directions d1 and d3. For example, each retroreflector 23 comprises three reflective surfaces 23A, 23B and 23C orthogonal to each other. The sides EA, EB and EC are included in the reflective surfaces 23A, 23B and 23C, respectively. The intersection of the three reflective surfaces 23A, 23B and 23C is equivalent to the center O of the retroreflector 23. For example, the center O of each retroreflector 23 becomes depressed to the back of the plane of paper. When each retroreflector 23 comprises a concave portion surrounded by the three reflective surfaces 23A, 23B and 23C, the edge EG is equivalent to the top portion of the retroreflector 23, and the center O is equivalent to the bottom portion of the retroreflector 23. It should be noted that each retroreflector 23 may comprise a convex portion surrounded by the three reflective surfaces 23A, 23B and 23C. In this case, the edge EG is equivalent to the bottom portion of the retroreflector 23, and the center O is equivalent to the top portion of the retroreflector 23.

These retroreflectors 23 are arranged in the third direction d3. The retroreflectors 23 are arranged in the first direction d1 with pitch P2. It should be noted that the shapes of the retroreflectors 23 adjacent to each other in the first and third directions d1 and d3 are reversed at 180 degrees with respect to each other. In FIG. 7, retroreflectors 231 and 232 are arranged in the first direction d1. The retroreflectors 231 and 232 are located such that they are line-symmetrical with respect to an edge E12.

The resolution of aerial images I1 and I2 depends on pitch P2 of the retroreflectors 23. To prevent the reduction of the resolution, pitch P2 is preferably less than pitch P1 of the pixels on the display panel PNL shown in FIG. 6.

FIG. 8 is a perspective view showing a structural example of each retroreflector 23 shown in FIG. 7. The shape of each retroreflector 23 is explained, applying a coordinate system in which x, y and z-axes are orthogonal to one another.

In the xyz coordinate system, each retroreflector 23 comprises three reflective surfaces 23A, 23B and 23C. The reflective surfaces 23A to 23C have the same shape. Each of the reflective surfaces 23A to 23C is formed into a right-angled isosceles triangle. The reflective surfaces 23A to 23C are orthogonal to one another. Each retroreflector 23 comprising the reflective surfaces 23A to 23C having the above shape is called a corner cube, a corner reflector, etc.

When point A on the x-axis is ($\alpha$, 0, 0), point B on the y-axis is (0, $\alpha$, 0), and point C on the z-axis is (0, 0, $\alpha$), the reflective surface 23A is formed in the x-y plane and is defined by the origin O and points A and B. The reflective surface 23B is formed in the y-z plane and is defined by the origin O and points B and C. The reflective surface 23C is formed in the x-z plane and is defined by the origin O and points A and C. The segment connecting points A and B, the segment connecting points B and C and the segment connecting points A and C are equivalent to the sides EA, EB and EC of the edge EG shown in FIG. 7, respectively. Here, the origin O is equivalent to the center O shown in FIG. 7.

When the origin O is equivalent to the bottom portion of the retroreflector 23, the surface defined by the three points A, B and C is not present. The internal side surrounded by the three reflective surfaces 23A to 23C is an air layer. When the origin O is equivalent to the top portion of the retroreflector 23, the surface defined by the three points A, B and C is present. The retroreflector 23 is a regular tetrahedron.

Each retroreflector 23 realizes retroreflection which reflects incident light in substantially the same optical path as the incident light by reflecting the light on the three reflective surfaces 23A to 23C. The vicinities of the three points A, B and C could be non-retroreflective portions which do not retroreflect light (in other words, non-retroreflective portions in which light is not reflected on the three reflective surfaces). The shape of each retroreflector 23 is not limited to the example shown in FIG. 8. The non-reflective portions may be cut.

FIG. 9 is a cross-sectional view showing a structural example of the modulating element 30 shown in FIG. 2. FIG. 9(a) is a cross-sectional view of the modulating element 30 controlled so as to be in the first mode. FIG. 9(b) is a cross-sectional view of the modulating element 30 controlled so as to be in the second mode. In FIG. 9, a first direction a, a second direction b and a third direction c are orthogonal to one another. FIG. 9 shows a surface parallel to the b-c plane defined by the second and third directions b and c. Here, the second linearly polarized light L2 as display light travels in the third direction c. In the example shown in FIG. 9, the direction of polarization of the second linearly polarized light L2 is parallel to the second direction b, and the direction of polarization of the first linearly polarized light L1 is parallel to the first direction a.

The modulating element 30 is a liquid crystal panel comprising support substrates 31 and 32, a first electrode 33, a second electrode 34, alignment films 35 and 36 and a liquid crystal layer 37. The first electrode 33 is located between the support substrate 31 and the alignment film (first alignment film) 35. The second electrode 34 is located between the support substrate 32 and the alignment film (second alignment film) 36. The liquid crystal layer 37 is located between the alignment film 35 and the alignment film 36. The support substrates 31 and 32 are transparent substrates for visible light, such as glass substrates or resinous substrates. The first electrode 33 and the second electrode 34 are formed of a transparent conductive material such as ITO or IZO. In the example shown in FIG. 9, the first electrode 33 is provided in the support substrate 31, and the second electrode 34 is provided in the support substrate 32. However, both the first electrode 33 and the second electrode 34 may be provided in the same substrate, in other words, in the support substrate 31 or 32. For example, the liquid crystal layer 37 has positive dielectric anisotropy. For example, the alignment films 35 and 36 are horizontal alignment films having alignment restriction force for aligning liquid crystal molecules 37M in a direction parallel to the main surfaces. Alignment treatment has been applied to the alignment film 35 in the second direction b. Alignment treatment has been applied to the alignment film 36 in the first direction a.

FIG. 9(a) shows the first mode (off state) in which voltage is not applied between the first and second electrodes 33 and 34 facing each other across the intervening liquid crystal layer 37. At this time, in the liquid crystal layer 37, 90° twist alignment is applied to the liquid crystal molecules 37M. Near the alignment film 35, the liquid crystal molecules 37M are initially aligned in the second direction b. Near the alignment film 36, the liquid crystal molecules 37M are initially aligned in the first direction a. When the second linearly polarized light L2 enters the modulating element 30 in the first mode, the axis of polarization is rotated by the effect of the twisted liquid crystal molecules 37M. Thus, after the second linearly polarized light L2 passes through the liquid crystal layer 37, the second linearly polarized light L2 becomes the first linearly polarized light L1.

FIG. 9(b) shows the second mode (on state) in which voltage is applied between the first electrode 33 and the second electrode 34. At this time, in the liquid crystal layer 37, the liquid crystal molecules 37M are vertically aligned such that their long axes are parallel to the formed electric field. The long axis of each liquid crystal molecule 37M is aligned in the third direction c. The second linearly polarized light L2 having entered the modulating element 30 in the second mode is less affected by the vertically-aligned liquid crystal molecules 37M, and passes through the liquid crystal layer 37 while maintaining the axis of polarization.

Figure 10:
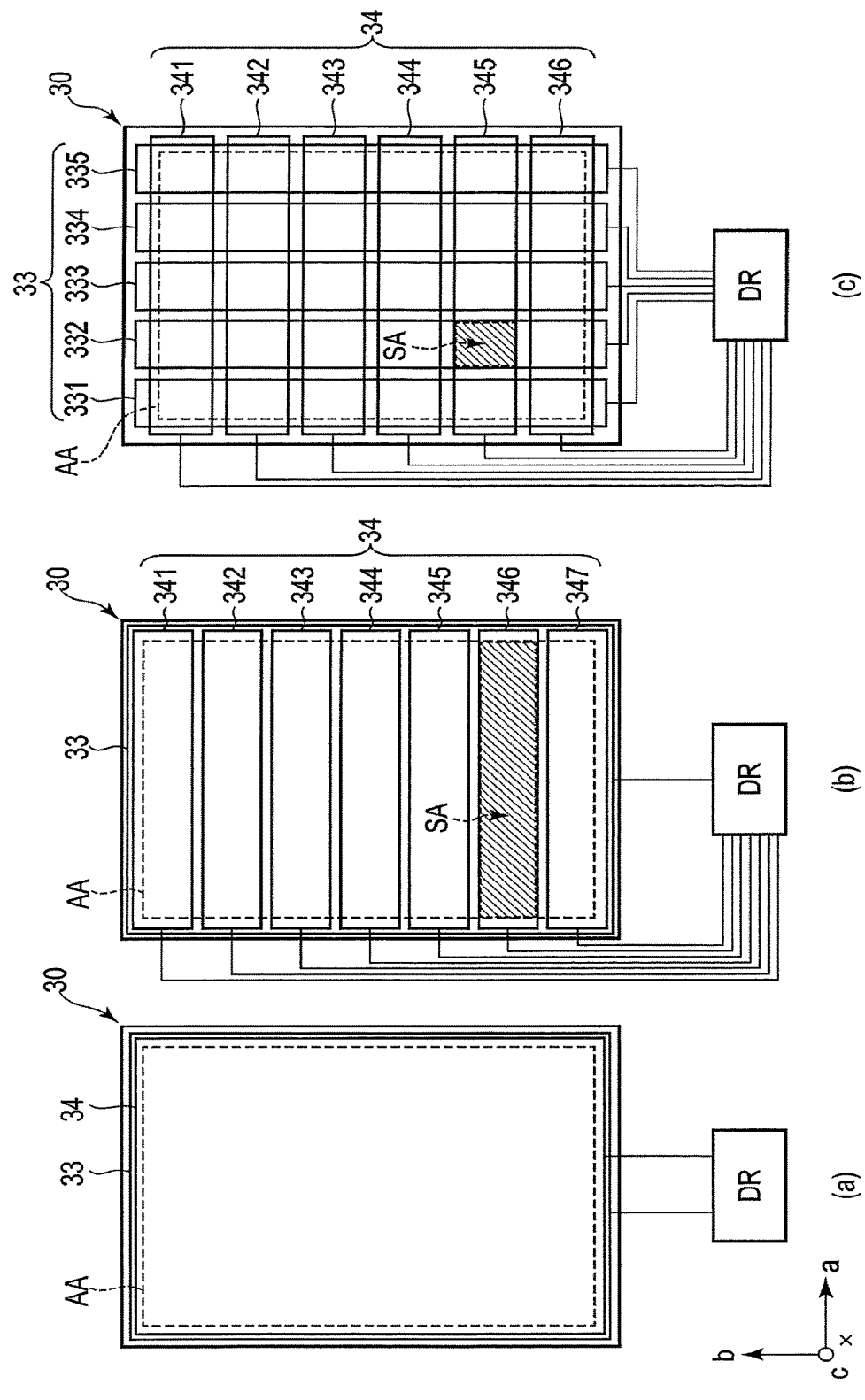
FIG. 10 is a plan view showing structural examples of the first and second electrodes shown in FIG. 7.

FIG. 10 is a plan view showing structural examples of the first and second electrodes 33 and 34 shown in FIG. 9. FIG. 10 shows a surface parallel to the a-b plane defined by the first and second directions a and b. The modulating element 30 comprises an effective area AA through which light is allowed to pass in the a-b plane. For example, the effective area AA has a rectangular shape comprising short sides parallel to the first direction a and long sides parallel to the second direction b. However, the shape is not limited to the examples shown in FIG. 10. The effective area AA may have other polygonal shapes, a circular shape or an elliptic shape.

In the structural example shown in FIG. 10(a), each of the first and second electrodes 33 and 34 is formed by a single sheet electrode continuously extending over the entire surface of the effective area AA. As described above, the first electrode 33 faces the second electrode 34 across the intervening liquid crystal layer 37. The driver DR is electrically connected to each of the first and second electrodes 33 and 34. In this structural example, the direction of alignment of the liquid crystal molecules 37M in the liquid crystal layer 37 is controlled on the entire surface of the effective area AA by controlling the voltage applied by the driver DR to the first and second electrodes 33 and 34. In this manner, the modulating element 30 is capable of controlling the first mode (in other words, the mode in which the polarization plane is rotated) and the second mode (in other words, the mode in which the polarization plane is not modulated) on the entire surface of the effective area AA.

The structural example shown in FIG. 10(b) is different from the structural example shown in FIG. 10(a) in respect that the effective area AA of the modulating element 30 comprises a plurality of strip-shaped subareas SA. In a manner similar to that of the structural example shown in FIG. 10(a), the first electrode 33 is formed by a single sheet electrode. The second electrode 34 is formed by a plurality of strip-shaped electrodes 341 to 347 spaced apart from one another. In the example shown in FIG. 10(b), each of the strip-shaped electrodes 341 to 347 has a rectangular shape extending in the first direction a. The strip-shaped electrodes 341 to 347 are arranged at intervals in the second direction b. The first electrode 33 faces the strip-shaped electrodes 341 to 347. The driver DR is electrically connected to the first electrode 33, and is electrically connected to each of the strip-shaped electrodes 341 to 347. Each subarea SA is equivalent to an overlapping portion in which the first electrode 33 overlaps one of the strip-shaped electrodes 341 to 347 in the a-b plane. In the example shown in FIG. 10(b), each subarea SA is a strip-shaped area extending in the first direction a.

The strip-shaped electrodes 341 to 347 may extend in the second direction b and be arranged at intervals in the first direction a. The structural example shown in FIG. 10(b) is equivalent to an example in which one of the first and second electrodes 33 and 34 is formed by a sheet electrode, and the other is formed by a plurality of strip-shaped electrodes. The first electrode 33 may be formed by a plurality of strip-shaped electrodes, and the second electrode 34 may be formed by a single sheet electrode.

In this structural example, the direction of alignment of the liquid crystal molecules 37M is controlled in each subarea SA by controlling the voltage individually applied by the driver DR to the strip-shaped electrodes 341 to 347. In this manner, the modulating element 30 is capable of controlling the first mode and the second mode for each subarea SA. The modulating element 30 of this structural example is also capable of controlling the first mode and the second mode on the entire surface of the effective area AA by collectively driving all the strip-shaped electrodes 341 to 347.

The structural example shown in FIG. 10(c) is different from the structural example shown in FIG. 10(a) in respect that the effective area AA of the modulating element 30 comprises a plurality of subareas SA in matrix. The first electrode 33 is formed by a plurality of strip-shaped electrodes 331 to 335 spaced apart from one another. The second electrode 34 is formed by a plurality of strip-shaped electrodes 341 to 346 spaced apart from one another. In the example shown in FIG. 10(c), the strip-shaped electrodes 331 to 335 extend in the second direction b, and are arranged at intervals in the first direction a. The strip-shaped electrodes 341 to 346 extend in the first direction a, and are arranged at intervals in the second direction b. The strip-shaped electrodes 331 to 335 face the strip-shaped electrodes 341 to 346. The driver DR is electrically connected to each of the strip-shaped electrodes 331 to 335, and is electrically connected to each of the strip-shaped electrodes 341 to 346. Each subarea SA is equivalent to a rectangular intersection in which one of the strip-shaped electrodes 331 to 335 intersects one of the strip-shaped electrodes 341 to 346 in the a-b plane. In the example shown in FIG. 10(c), the subareas SA are arranged in matrix in the first direction a and the second direction b.

In this structural example, the direction of alignment of the liquid crystal molecules 37M is controlled in each subarea SA by controlling the voltage individually applied by the driver DR to the strip-shaped electrodes 331 to 335 and the strip-shaped electrodes 341 to 346. In this manner, the modulating element 30 is capable of controlling the first mode and the second mode for each subarea SA. The modulating element 30 of this structural example is also capable of controlling the first mode and the second mode on the entire surface of the effective area AA by collectively driving all the strip-shaped electrodes 331 to 335 and 341 to 346.

In the above structural example, the shape of each subarea SA is not limited to a rectangular shape. Each subarea SA may have other polygonal shapes, a circular shape, an elliptic shape or an arbitrary shape. The shapes of the first and second electrodes 33 and 34 defining the shape of the subareas SA can be freely selected.

Figure 11:
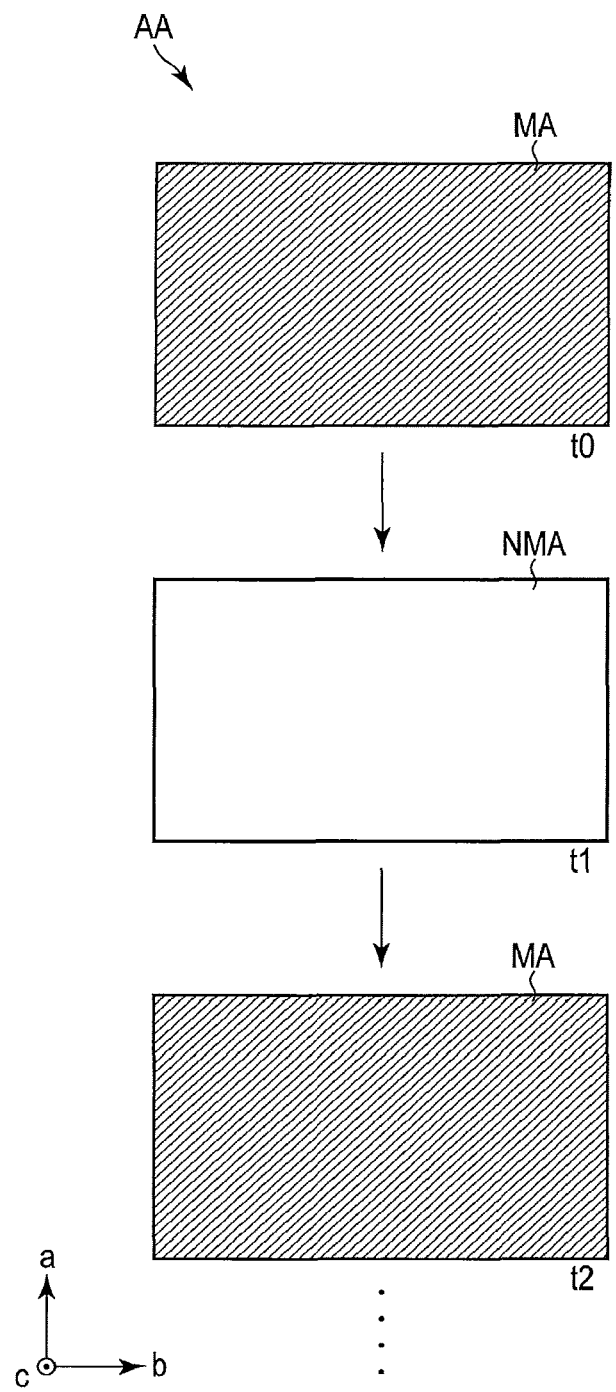
FIG. 11 shows the distribution of a phase difference imparted to transmitted light in the effective area shown in FIG. 8.

FIG. 11 is a plan view showing the distribution of a phase difference imparted to transmitted light in the effective area AA shown in FIG. 10. Here, of the effective area AA, an area which imparts a phase difference of approximately $\lambda/2$ to transmitted light is referred to as a modulation area MA, and an area which does not impart a phase difference to transmitted light is referred to as a non-modulation area NMA. The modulation area MA is realized by the first mode. The non-modulation area NMA is realized by the second mode.

In the example shown in FIG. 11, the modulation area MA and the non-modulation area NMA alternate over the entire surface of the effective area AA. For example, the entire surface of the effective area AA is the modulation area MA at time t0, is the non-modulation area NMA at time t1, and is the modulation area MA at time t2. At time t0 and time t2, the second linearly polarized light having entered the modulating element 30 is modulated into the first linearly polarized light and ultimately forms aerial image I2. The second linearly polarized light having passed through the modulating element 30 without modulation at time t1 ultimately forms aerial image I1. This structure is realized by all the structures of FIG. 10(a) to FIG. 10(c).

Now, this specification explains the modulating element 30 which spatially modulates light.

Figure 12:
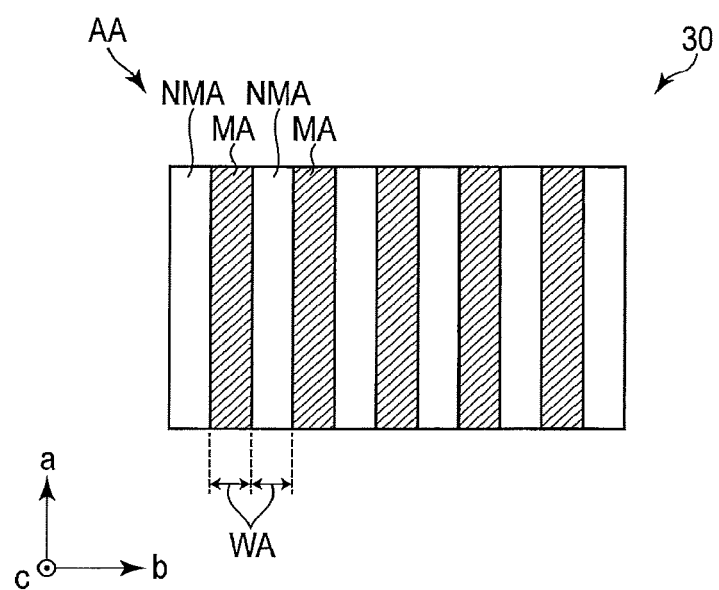
FIG. 12 is a plan view showing another structural example of the modulating element shown in FIG. 2.

FIG. 12 is a plan view showing another structural example of the modulating element 30 shown in FIG. 2. The modulating element 30 shown in FIG. 12 is different from the structural example shown in FIG. 11 in respect that the effective area AA includes the modulation areas MA and the non-modulation areas NMA. In the example shown in FIG. 12, the modulation areas MA and the non-modulation areas NMA extend in the first direction a, and are alternately arranged in the second direction b. For example, width WA of each modulation area MA and each non-modulation area NMA is equivalent to pitch P1 of the main pixels. Here, width WA is parallel to the second direction b. Width WA may be an integral multiple of pitch P1.

In the example shown in FIG. 12, when the second linearly polarized light enters the modulation areas MA of the effective area AA, the second linearly polarized light is modulated into the first linearly polarized light, and forms aerial image I2. The second linearly polarized light having passed through the non-modulation areas NMA without modulation forms aerial image I1. This structure is realized by the structure shown in FIG. 10(b) or FIG. 10(c). Alternatively, this structure may be realized with a retardation film without using a liquid crystal panel. When the modulating element 30 is a retardation film, the retardation film may be a single film comprising the modulation area MA which imparts a phase difference and the non-modulation area NMA which does not impart a phase difference. Alternatively, the retardation film may be a film comprising an aperture portion in the non-modulation area NMA. Here, the modulation area MA imparts a phase difference of approximately λ/2 to transmitted light. When the modulation element 30 is a retardation film, the retardation film may be attached to the display surface IP0 or may be directly formed on the display surface IP0.

In the present embodiment, the display device 1 comprises the optical element 10 which transmits part of display light and reflects the other part, and the first and second retroreflective elements 201 and 202 which retroreflect incident light. In this way, the display device 1 is capable of displaying aerial images I1 and I2 having different imaging planes. For example, aerial image I1 can be observed on the rear side of aerial image I2. Thus, the observer can view an image with an appearance of depth. Further, the depth, in other words, distance LIP between aerial image I1 and aerial image I2, can be freely set by thickness 13T of the support substrate 13 located between the first polarizing element 11 and the second polarizing element 12.

[Second Embodiment]

Figure 13:
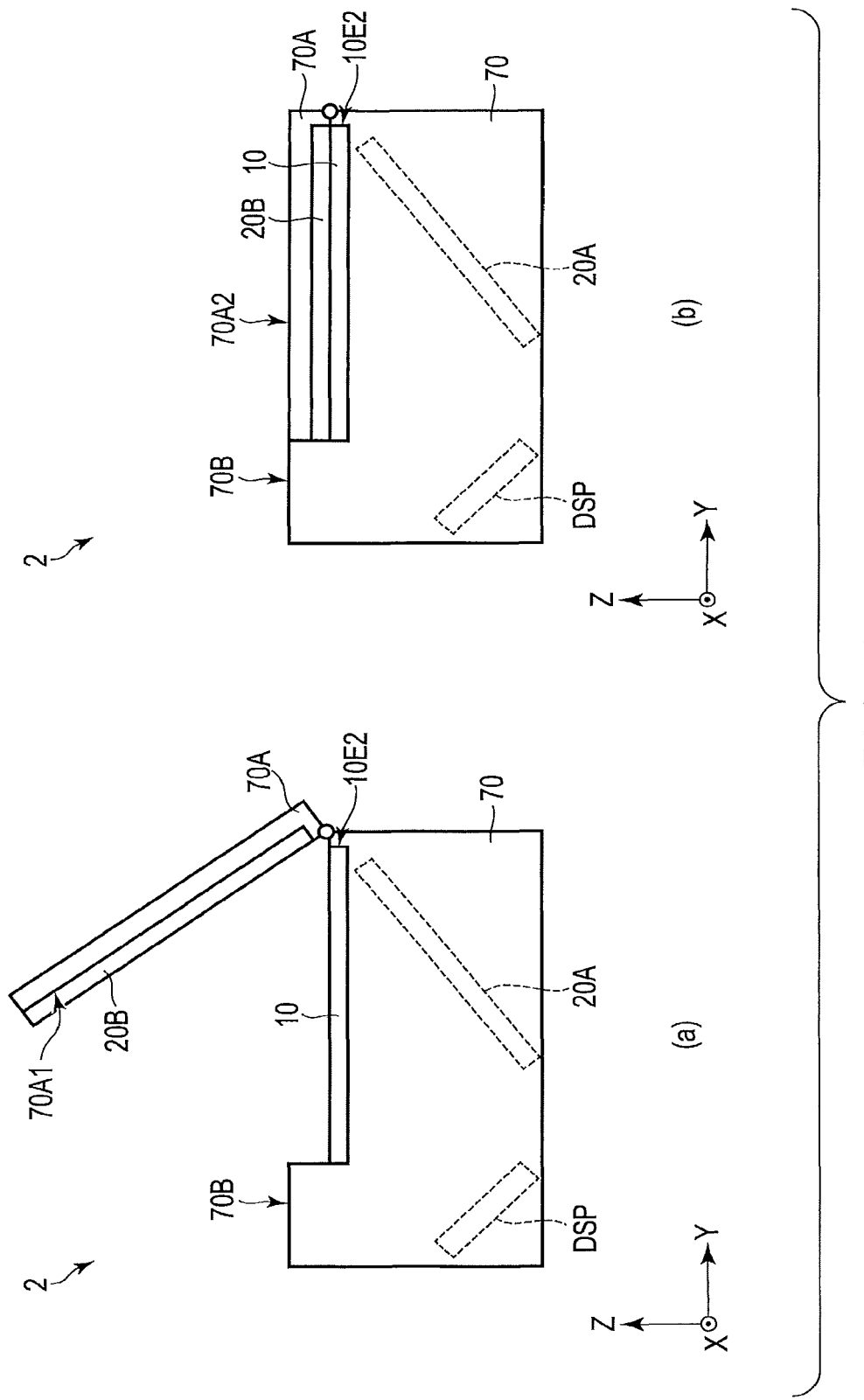
FIG. 13 is a perspective view showing an example of the external appearance of a display device according to a second embodiment.

FIG. 13 schematically shows the external appearance of a display device 2 according to a second embodiment. FIG. 13 shows a surface parallel to the X-Z plane defined by a first direction X and a third direction Z. The second embodiment is different from the first embodiment in respect that a housing 70 comprises a cover 70A, and an optical element 20B is provided on the internal surface 70A1 of the cover 70A.

An optical element 10 is located on a side lower than the upper surface 70B of the housing 70, in other words, on a side closer to a display unit DSP than the upper surface 70B. In the example shown in FIG. 13, the cover 70A is attached to the housing 70 near an edge portion 10E2. The cover 70A is freely rotatable based on the axis parallel to the first direction X. FIG. 13(a) shows an open state in which the cover 70A is open. In the open state, the cover 70A is allowed to be held at an arbitrary position. FIG. 13(b) shows a closed state in which the cover 70A is closed. In the closed state, the external surface 70A2 of the cover 70A is aligned with the upper surface 70B.

In the present embodiment, an effect similar to that of the first embodiment can be obtained. Further, in the present embodiment, the optical elements 10 and 20B can be protected by closing the cover 70A. As the background of aerial images I1 and I2 can be darkened by the cover 70A, the visibility of aerial images I1 and I2 can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   first and second retroreflective elements which retroreflect incident light;
   an optical element which is located between the first retroreflective element and the second retroreflective element, and comprises a first surface facing the first retroreflective element and a second surface facing the second retroreflective element; and
   a display unit which is located on a side facing the first surface and emits display light, wherein
   the optical element includes a first polarizing element comprising the first surface, and a second polarizing element comprising the second surface and spaced apart from the first polarizing element, and
   the first and second polarizing elements comprise a transmission axis which transmits first linearly polarized light and reflects second linearly polarized light intersecting the transmission axis.

2. The display device of claim 1, further comprising a support substrate located between the first polarizing element and the second polarizing element.

3. The display device of claim 1, further comprising:
   a first retardation film which overlaps the first retroreflective element and imparts a phase difference to transmitted light; and
   a second retardation film which overlaps the second retroreflective element and imparts a phase difference to transmitted light.

4. The display device of claim 1, wherein
   the display unit comprises a display panel which emits second linearly polarized light, and a modulating element which overlaps the display panel, and
   the modulating element selectively modulates the second linearly polarized light into first linearly polarized light.

5. The display device of claim 4, wherein
   the display panel includes main pixels arranged with a first pitch,
   the first retroreflective element includes retroreflectors arranged with a second pitch, and
   the second pitch is less than the first pitch.

6. The display device of claim 4, wherein
   the modulating element comprises an effective area which transmits light, and
   the effective area is temporally switched between a modulation area which modulates the second linearly polarized light into the first linearly polarized light and a non-modulation area which transmits the second linearly polarized light.

7. The display device of claim 6, wherein
   the modulating element is a liquid crystal panel.

8. The display device of claim 7, wherein
   the liquid crystal panel comprises a first alignment film, a second alignment film facing the first alignment film, and a liquid crystal layer held between the first alignment film and the second alignment film,
   alignment treatment is applied to the first alignment film in a second direction, and
   alignment treatment is applied to the second alignment film in a first direction intersecting the second direction.

9. The display device of claim 8, wherein
   the modulating element comprises a single first electrode provided over the entire effective area, and a single second electrode facing the first electrode across the intervening liquid crystal layer.

10. The display device of claim 8, wherein
the modulating element comprises a single first electrode provided over the entire effective area, and a plurality of second electrodes facing the first electrode across the intervening liquid crystal layer.

11. The display device of claim 8, wherein
the modulating element comprises a plurality of first electrodes provided over the entire effective area, and a plurality of second electrodes facing the first electrodes across the intervening liquid crystal layer,
the first electrodes are arranged in the first direction, and
the second electrodes are arranged in the second direction.

12. The display device of claim 4, wherein
the modulating element comprises an effective area which transmits light, and
the effective area includes a modulation area which modulates the second linearly polarized light into the first linearly polarized light, and a non-modulation area which transmits the second linearly polarized light.

13. The display device of claim 12, wherein
the modulating element is a liquid crystal panel or a retardation film.

14. The display device of claim 12, wherein
the modulation area and the non-modulation area extend in a first direction, and are alternately arranged in a second direction intersecting the first direction.

15. The display device of claim 14, wherein
the display panel includes main pixels arranged with a first pitch, and
a width of the modulation area in the second direction and a width of the non-modulation area in the second direction are equal to the first pitch.

16. The display device of claim 1, wherein
the optical element comprises a first edge portion, and a second edge portion on a side opposite to the first edge portion,
a first distance between the first retroreflective element and the first surface on the first edge portion side is greater than a third distance between the first retroreflective element and the first surface on the second edge portion side, and
a second distance between the second retroreflective element and the second surface on the first edge portion side is greater than a fourth distance between the second retroreflective element and the second surface on the second edge portion side.

17. A display device comprising:
a first optical element which comprises a transmission axis transmitting first linearly polarized light, and reflects second linearly polarized light intersecting the transmission axis;
a display unit which emits the first linearly polarized light and the second linearly polarized light toward the first optical element;
a second optical element which retroreflects the second linearly polarized light reflected on the first optical element, and modulates the second linearly polarized light reflected on the first optical element into the first linearly polarized light; and
a third optical element which retroreflects the first linearly polarized light having passed through the first optical element, and modulates the first linearly polarized light having passed through the first optical element into the second linearly polarized light.

* * * * *